(12) United States Patent
Alrowaeyh et al.

(10) Patent No.: US 10,782,267 B1
(45) Date of Patent: Sep. 22, 2020

(54) MOBILE NON-DESTRUCTIVE TESTING INSPECTION SYSTEM

(71) Applicant: EQUATE PETROCHEMICAL COMPANY, Ahmadi (KW)

(72) Inventors: Abdullah S. S. A. Alrowaeyh, Kuwait (KW); Abdulrahman T. N. F. I. Almutawa, Kuwait (KW); Soud A. S. A. A. Aldeweesh, Kuwait (KW); Yousef A. J. K. J. E. Alhaddad, Kuwait (KW); Yousuf A. A. M. Safar, Kuwait (KW)

(73) Assignee: EQUATE PETROCHEMICAL COMPANY, Ahmadi (KW)

( * ) Notice: Subject to any disclaimer, the term of this patent is extended or adjusted under 35 U.S.C. 154(b) by 0 days.

(21) Appl. No.: 16/672,616

(22) Filed: Nov. 4, 2019

(51) Int. Cl.
| | |
|---|---|
| *G01N 27/90* | (2006.01) |
| *B25J 9/16* | (2006.01) |
| *B25J 11/00* | (2006.01) |
| *B25J 19/02* | (2006.01) |
| *B25J 18/02* | (2006.01) |

(52) U.S. Cl.
CPC .......... *G01N 27/9053* (2013.01); *B25J 9/162* (2013.01); *B25J 9/1694* (2013.01); *B25J 11/00* (2013.01); *B25J 19/023* (2013.01); *B25J 18/025* (2013.01); *G01N 27/9033* (2013.01)

(58) Field of Classification Search
None
See application file for complete search history.

(56) References Cited

U.S. PATENT DOCUMENTS

| | | | | | |
|---|---|---|---|---|---|
| 4,595,419 | A | * | 6/1986 | Patenaude | ............... G21F 9/005 134/1 |
| 5,265,667 | A | * | 11/1993 | Lester, II | .............. F22B 37/005 165/11.2 |
| 5,355,063 | A | * | 10/1994 | Boone | .................... F22B 37/005 318/568.11 |

(Continued)

FOREIGN PATENT DOCUMENTS

FR    3056134 A1    3/2018

OTHER PUBLICATIONS

"General Electric® BIKE Platform Ultra Mobile Inspection Robot," © 2016 GE Inspection Robotics Ltd.

(Continued)

*Primary Examiner* — Paresh Patel
(74) *Attorney, Agent, or Firm* — Nath, Goldberg & Meyer; Richard C. Litman

(57) ABSTRACT

The mobile non-destructive testing inspection system includes a mobile platform, a robotic arm mounted on the mobile platform, and an end effector for the robotic arm. The end effector includes a non-destructive testing (NDT) probe. As a non-limiting example, the NDT probe may be an eddy current testing probe. The mobile platform may be a robotic mobile platform under external control by a remote operator. The robotic arm is mounted on the mobile platform using a mounting plate, which is secured to an upper surface of the mobile platform, and includes a bracket or the like for attachment to a base of the robotic arm. The end effector is connected to an end connector of the robotic arm. The NDT probe of the end effector may be mounted on a support member, which may be selectively rotatable with respect to the end connector of the robotic arm.

5 Claims, 3 Drawing Sheets

(56) References Cited

U.S. PATENT DOCUMENTS

| | | | |
|---|---|---|---|
| 7,690,234 B2* | 4/2010 | Mori | F22B 37/005 |
| | | | 376/305 |
| 8,812,154 B2 | 8/2014 | Vian et al. | |
| 9,149,929 B2 | 10/2015 | Motzer et al. | |
| 9,581,438 B2 | 2/2017 | Messinger et al. | |
| 2011/0125462 A1* | 5/2011 | Petrosky | F22B 37/003 |
| | | | 702/188 |
| 2015/0012162 A1 | 1/2015 | Cobb et al. | |
| 2018/0164251 A1* | 6/2018 | Hand | G01N 27/9046 |
| 2018/0313715 A1 | 11/2018 | Cichosz et al. | |
| 2018/0361595 A1 | 12/2018 | Troy et al. | |
| 2019/0255716 A1* | 8/2019 | Neville | B25J 9/0027 |

OTHER PUBLICATIONS

Hunt et al., "Rapid Response Non-Destructive Inspection Robot for Condition Assessment of Critical Water Mains," Australasian Conference on Robotics and Automation, ARAA, 2018, pp. 1-7.

* cited by examiner

MOBILE NON-DESTRUCTIVE TESTING INSPECTION SYSTEM

BACKGROUND

1. Field

The disclosure of the present patent application relates to inspection using non-destructive testing (NDT), and particularly to a mobile robotic system for performing NDT inspection.

2. Description of the Related Art

Non-destructive testing (NDT) is a term used to describe a wide group of analysis techniques used in a variety of industries to evaluate the properties of a material, component or system without causing damage thereto. NDT is also sometimes referred to as "non-destructive examination", "non-destructive inspection" and "non-destructive evaluation". Common NDT techniques include magnetic particle inspection, liquid penetrant inspection, radiographic inspection, ultrasonic inspection, visual testing, and eddy current inspection. Such inspection and testing methods are often used to inspect pipelines, vessels, structural components and the like, where it would be undesirable to cause damage to the structure being inspected.

Eddy current inspection, as an example, makes use of electromagnetic induction to detect and characterize surface and sub-surface flaws in conductive materials. In its most basic form, a single-element eddy current testing (ECT) probe is used, which is formed from a coil of conductive wire, which is then excited with an alternating electrical current. This wire coil produces an alternating magnetic field around itself. The magnetic field oscillates at the same frequency as the current running through the coil, and when the coil approaches a conductive material, currents opposite to the ones in the coil are induced in the material. Such currents are referred to as "eddy currents". Variations in the electrical conductivity and magnetic permeability of the test object, and the presence of defects, cause a change in eddy current, and a corresponding change in phase and amplitude, that can be detected by measuring the impedance changes in the coil, thus giving an easily detectable indication of the presence of defects.

ECT has a wide range of applications, though since ECT is electrical in nature, it is limited solely to the testing of conductive materials. There are also physical limits to generating eddy currents and depth of penetration (i.e., "skin depth"). The two major applications of eddy current testing are surface inspection and tubing inspections. Surface inspection is used extensively in the aerospace industry, but is also relatively common in the petrochemical industry. The technique is very sensitive and can detect tight cracks. Surface inspection can be performed both on ferromagnetic and non-ferromagnetic materials. Tubing inspection is generally limited to non-ferromagnetic tubing and is known as "conventional" eddy current testing. Conventional ECT is used for inspecting steam generator tubing in nuclear plants and heat exchanger tubing in the power and petrochemical industries, for example. The technique is very sensitive for detection and size determination of pits.

An example of a commonly used ECT probe, the Sharck probe, manufactured by Eddyfi NDT, Inc. of Canada, is designed specifically for the detection of cracking in carbon steel, and makes use of tangential eddy current array (TECA) technology. In conventional ECT, the induction coil axes are positioned perpendicular to the surface under test. TECA, on the other hand, uses tangential coils positioned on their sides, with their central axes positioned parallel to the surface under test. Eddy currents then flow parallel to the surface, making them capable of "diving" under cracks. The Sharck probe is typically handheld, or mounted on handheld equipment. However, due to the typical applications of ECT, particularly in tubing inspection and surface inspection for pipelines, it is often difficult, dangerous or impossible for a human inspector to carry the ECT probe to the desired site of inspection. Thus, a mobile non-destructive testing inspection system solving the aforementioned problems is desired.

SUMMARY

The mobile non-destructive testing inspection system includes a mobile platform, a robotic arm mounted on the mobile platform, and an end effector for the robotic arm. The end effector includes a non-destructive testing (NDT) probe. As a non-limiting example, the NDT probe may be an eddy current testing probe, such as the Sharck probe, manufactured by Eddyfi NDT, Inc. of Canada, as described above. The mobile platform may be a robotic mobile platform under external control by a remote operator. The robotic arm may be mounted on the mobile platform using a mounting plate, which is secured to an upper surface of the mobile platform, and includes a bracket or the like for attachment to a base of the robotic arm. The end effector may be connected to an end connector of the robotic arm. The NDT probe of the end effector may be mounted on a support member, which may be selectively rotatable with respect to the end connector of the robotic arm.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
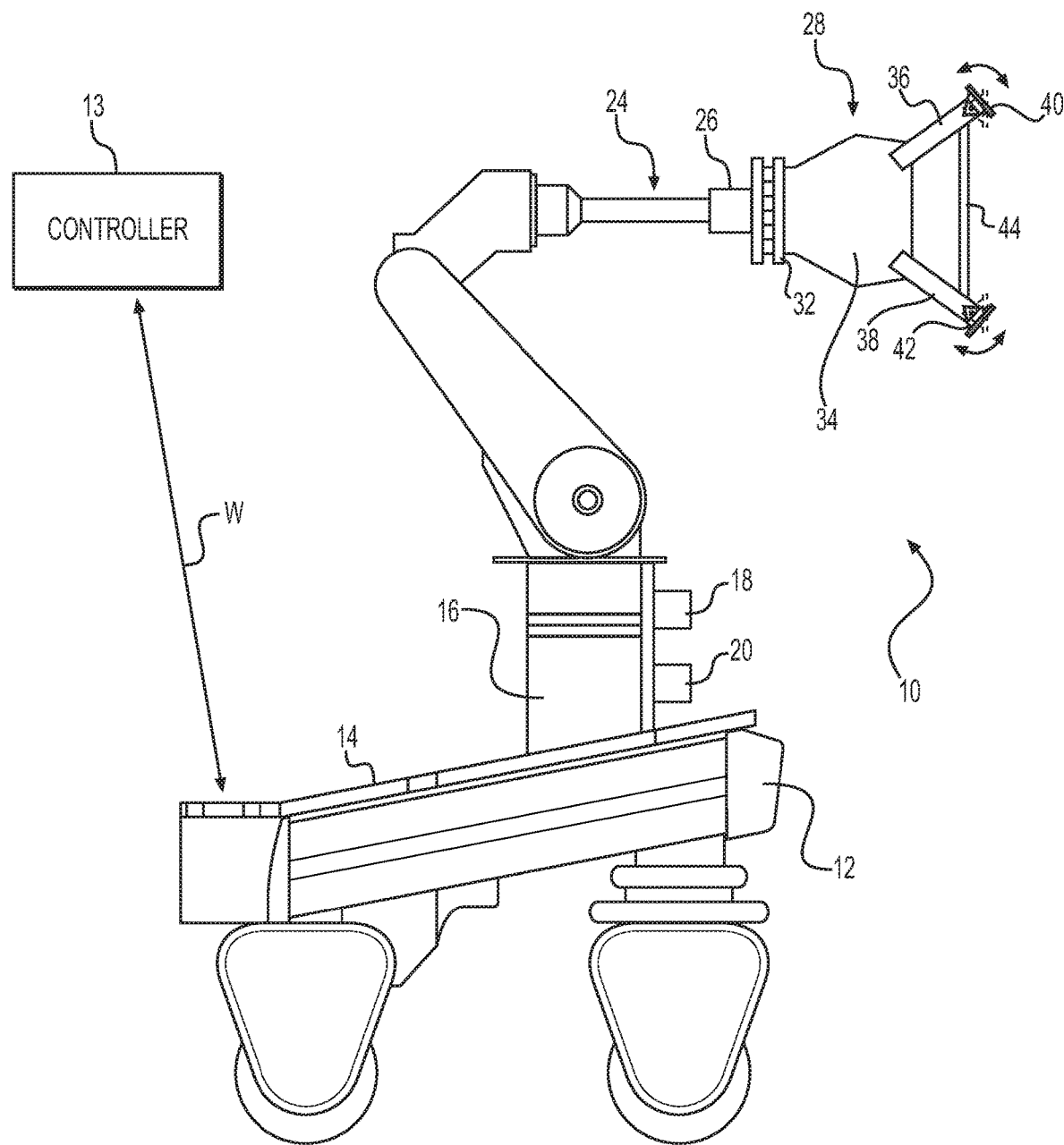
FIG. 1 is a side view of a mobile non-destructive testing inspection system.
Figure 2:
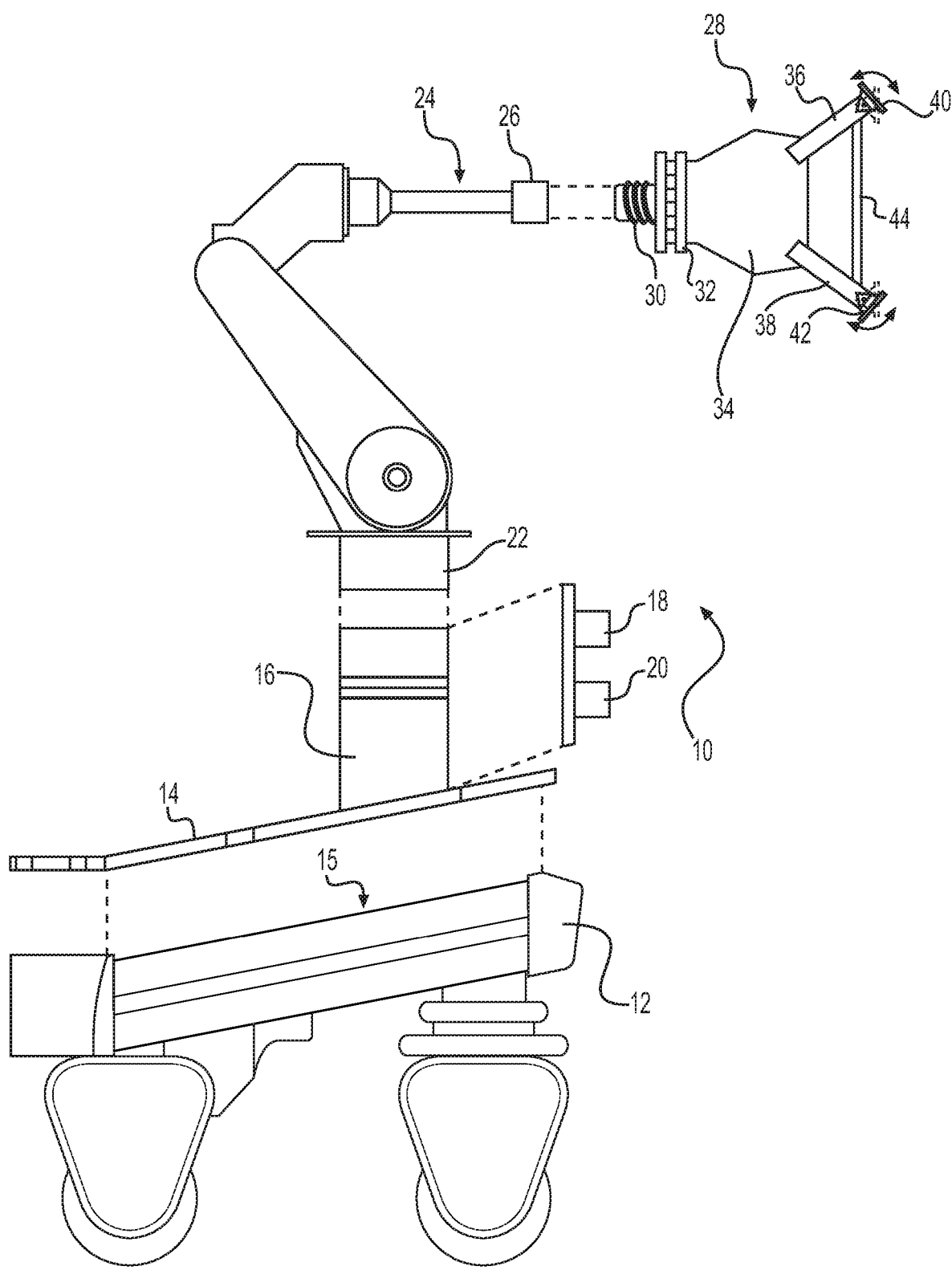
FIG. 2 is an exploded side view of the mobile non-destructive testing inspection system.

As best seen in FIGS. 1 and 2, the mobile non-destructive testing inspection system 10 includes a mobile platform 12, a robotic arm 24 mounted on the mobile platform 12, and an end effector 28 for the robotic arm 24. The end effector 28 includes a non-destructive testing (NDT) probe 44. As a non-limiting example, the NDT probe 44 may be an eddy current testing probe, such as the Sharck probe, manufactured by Eddyfi NDT, Inc. of Canada, as described above. The mobile platform 12 may be a robotic mobile platform under external control by a remote operator. In FIG. 1, an external controller 13 is shown wirelessly communicating with mobile platform 12 through wireless signal W, although it should be understood that mobile platform 12 may be under wired control, wireless control, or may have onboard programming operated by an onboard controller 100, as will be described in greater detail below. Additionally, in certain embodiments, the mobile platform 12 can use wheels, tracks, treads, etc. to enable the motion thereof. Any such wheels, tracks, etc. may be magnetic to enable use of the mobile non-destructive testing system 10 for vessel or pipe inspection, for example.

The robotic arm 24 is mounted on the mobile platform 12 using a mounting plate 14, which is secured to an upper surface 15 of mobile platform 12. It should be understood that the overall configuration, contouring and relative dimensions of mounting plate 14 are dependent upon the particular type of mobile platform being used. As will be described in greater detail below, mobile platforms, including remotely controlled robotic mobile platforms, are well known in the art, and mobile platform 12 may be any suitable type of mobile platform. Thus, a variety of configurations of mounting plate 14 may be manufactured for secure mounting on the selected type of mobile platform. It should be understood that mobile platform 12 and mounting plate 14 are shown for exemplary and illustrative purposes only.

Mounting plate 14 includes a bracket 16 or the like for attachment to a base 22 of the robotic arm 24. Robotic arms are well known in the art, and it should be understood that any suitable type of robotic arm may be used. Additionally, bracket 16 or any other suitable connector may be customized to securely engage the base of the selected type of robotic arm. It should be understood that bracket 16, base 22 and robotic arm 24 are shown for exemplary and illustrative purposes only.

Similarly, end effectors for robotic arms, and connectors for attaching end effectors to robotic arms, are well known in the art. In FIG. 2, end effector 28 is shown being releasably attached to end connector 26 of robotic arm 24 by a threaded member 30. It should be understood that the threaded attachment shown in FIG. 2 is shown for exemplary purposes only, and that any suitable type of connector or attachment may be utilized. Similarly, it should be understood that end connector 26 is shown for exemplary and illustrative purposes only, and that any suitable type of end connector may be provided, such as those typically provided with robotic arms. It should be further understood that end effector 28 may be releasably attached to end connector 26 of robotic arm 24, or may, alternatively, be permanently secured thereto.

As discussed above, end effector 28 includes the NDT probe 44, which may be an eddy current testing probe or the like. As shown in FIGS. 1 and 2, the NDT probe 44 may be mounted on a support member 34, which may be selectively rotatable with respect to the end connector 26 of the robotic arm 24. It should be understood that the overall configuration, contouring and relative dimensions of support member 34 are shown for exemplary purposes only. In the exemplary orientation illustrated in FIGS. 1 and 2, support member 34 would rotate about a horizontal axis embedded in the plane of the page.

In order to effect rotation of support member 34 (and NDT probe 44), a relatively simple rotational joint 32 is shown in FIGS. 1 and 2. It should be understood that rotational joint 32 is shown for exemplary and illustrative purposes only, and that any suitable type of rotational attachment, joint, actuator or the like may be used. Further, as will be described in greater detail below, rotational joint 32 may be coupled to any suitable type of drive or actuator, allowing rotation of support member 34 to be under the control of onboard controller 100 (as described in greater detail below).

The end effector 28 may optionally further include at least one arm, projecting outwardly from support member 34. In the non-limiting example of FIGS. 1 and 2, two such arms 36, 38 are shown, with NDT probe 44 secured thereto, and extending therebetween. Each of arms 36, 38 has a fixed end, which is secured to support member 34, and a free end. As shown, surface contacting members 40, 42 may be pivotally secured to the respective free ends of arms 36, 38. In use, in order to easily position and stabilize the NDT probe 44 adjacent a surface to be inspected, mobile platform 12 is carefully navigated such that surface contacting members 40, 42 make secure stabilizing contact with the surface. The surface contacting members 40, 42 are pivotally attached to the free ends of arms 36, 38, respectively, in order to easily adapt to a surface which is irregular or inclined. In other embodiments, the NDT probe 44 may be connected to the free ends of arms 36, 38.

As noted above, it should be understood that mobile platform 12 may be any suitable type of mobile and/or robotic platform suitable for carrying and transporting the robotic arm 24. As a non-limiting example, mobile platform 12 may be the BIKE platform, manufactured by GE® Inspection Robotics Ltd. of Switzerland. The BIKE platform is a magnetic wheeled robot adapted for vessel or pipe inspection, for example. The BIKE platform is equipped with integrated navigation cameras and three-dimensional position sensors for providing the operator with precise information in real time, either wirelessly or by wired transmission, about the platform's position and environment. The BIKE platform is remotely controlled and includes a variety of onboard and remote navigational aids.

Although the BIKE platform is equipped with inspection optics, as noted above, any suitable type of mobile platform 12 may be used. Thus, for a mobile platform which does not have integrated optical components, one or more light sources 18 and one or more cameras 20 may be mounted on mobile platform 12. It should be understood that any suitable type of light sources, such as light emitting diodes (LEDs), lamps or the like, may be used. Similarly, it should be understood that any suitable type of cameras, such as video cameras, digital cameras, infrared cameras, optical sensors or the like, may be used. Images from any such cameras may be transmitted to the operator in real time, either wirelessly or by wired transmission, to provide the operator with precise information about the platform's position and environment, thus assisting the operator with controlling the mobile platform 12.

It should be similarly understood that controller 13 may be any suitable type of controller for providing remote control of mobile platform 12, robotic arm 24, end effector 28, and for further collecting and/or displaying data collected by NDT probe 44. As a non-limiting example, controller 13 may be a second generation Integrated Control Station (ICS 2), also manufactured by GE® Inspection Robotics Ltd. of Switzerland and used in combination with the BIKE platform. The ICS 2 includes a touchscreen display, an internal computer running control and navigation software, a transceiver, data ports and a joystick controller for remotely navigating the BIKE platform. In FIG. 1, controller 13 is shown communicating wirelessly with an onboard wireless transceiver of mobile platform 12 via wireless signal W, however, it should be understood that any suitable type of navigational and data communication may take place, including both wired and wireless communication.

Figure 3:
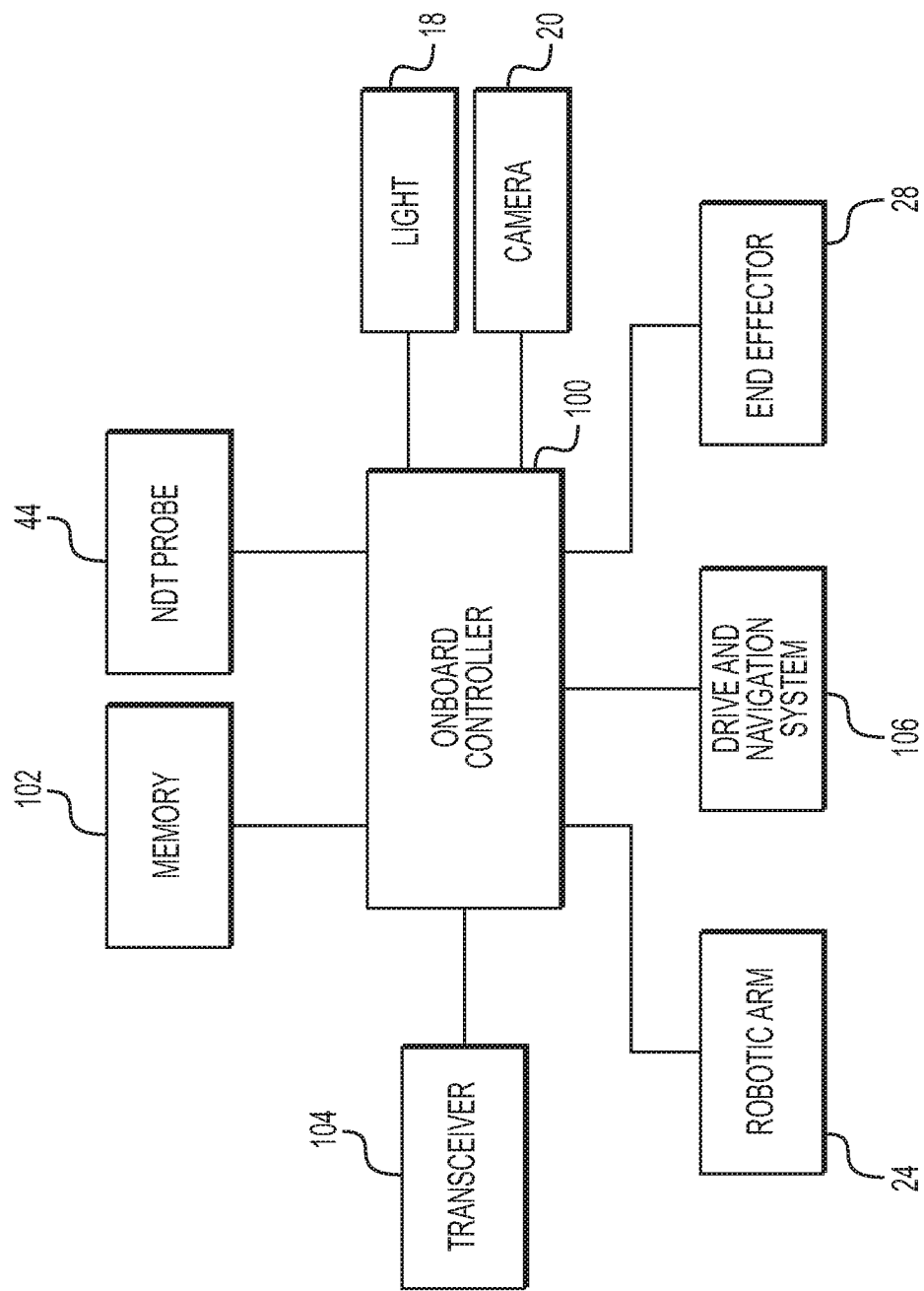
FIG. 3 is a block diagram showing control system components of the mobile non-destructive testing inspection system.

The external controller 13 communicates with an onboard controller 100 through an onboard transceiver 104, as illustrated in FIG. 3. The BIKE platform is provided with an onboard controller, transceiver, memory and additional control circuitry, however, it should be understood that onboard controller 100 and its associated components may be similarly integrated into mobile platform 12, or may be separately mounted on or in mobile platform 12. Onboard controller 100 may be associated with, or incorporated into, any suitable type of computing device, for example, a personal computer or a programmable logic controller. The onboard controller 100, its associated non-transitory computer readable memory 102 and transceiver 104 are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 102, or in place of memory 102, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

Transceiver 104 may be any suitable type of wired or wireless transceiver for receiving data from, and transmitting data to, the external controller 13. Navigational data from external controller 13 is received by transceiver 104 and transmitted to onboard controller 100. Alternatively, at least a portion of the navigational control data may be stored in memory 102. Onboard controller 100 transmits navigational control signals to the drive and navigation system 106, which effects movement of mobile platform 12, as is conventionally known. Onboard controller 100 further transmits control signals to robotic arm 24, to effect desired three-dimensional movement therein, and end effector 28 to drive rotation of support member 34 about rotational joint 32 via any suitable type of actuator, drive or the like. Onboard controller 100 further actuates and operates NDT probe 44, light source 18 and camera 20. Onboard controller receives inspection data from NDT probe 44 and visual inspection data from camera 20, as well as navigational data, and this data is transmitted back in real time to external controller 13 through transceiver 104.

It is to be understood that the mobile non-destructive testing inspection system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A mobile non-destructive testing inspection system adapted to perform eddy current inspection of a surface, comprising:
    a mobile platform;
    a mounting plate mounted on an upper surface of the mobile platform;
    a bracket mounted on the mounting plate;
    a robotic arm having a base and an end connector, the base of the robotic arm being mounted on the mounting plate by the bracket; and
    an end effector releasably connected to the end connector of the robotic arm, the end effector consisting of:
        i) a support member, the support member being selectively rotatable with respect to the end connector of the robotic arm;
        ii) a pair of arms, each of the arms having a fixed end and a free end and projecting outwardly from the support member, the fixed end thereof being secured to the support member;
        iii) a pair of surface contact members, each of the surface contact members being pivotally attached to the free ends of a respective arm; and
        iv) a non-destructive eddy current testing probe, the testing probe being attached to the free ends of the arms.

2. The mobile non-destructive testing inspection system as recited in claim 1, wherein the mobile platform comprises a robotic platform.

3. The mobile non-destructive testing inspection system as recited in claim 2, wherein the robotic platform is a remotely controllable robotic platform.

4. The mobile non-destructive testing inspection system as recited in claim 1, further comprising a light source mounted on the mobile platform.

5. The mobile non-destructive testing inspection system as recited in claim 4, further comprising a camera mounted on the mobile platform.

\* \* \* \* \*